(12) United States Patent
Hierholzer et al.

(10) Patent No.: US 7,327,677 B2
(45) Date of Patent: Feb. 5, 2008

(54) METHOD FOR ESTABLISHMENT OF CONNECTIONS OF PRE-DETERMINED PERFORMANCE FOR A PACKET-ORIENTED COMMUNICATION NETWORK WITH A RESOURCE MANAGER

(75) Inventors: Peter Hierholzer, Wielenbach (DE); Karl Klaghofer, München (DE); Harald Müller, Gilching (DE); Christian Prehofer, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 958 days.

(21) Appl. No.: 10/380,406

(22) PCT Filed: Aug. 29, 2001

(86) PCT No.: PCT/DE01/03325

§ 371 (c)(1),
(2), (4) Date: Mar. 13, 2003

(87) PCT Pub. No.: WO02/23828

PCT Pub. Date: Mar. 21, 2002

(65) Prior Publication Data
US 2004/0109413 A1    Jun. 10, 2004

(30) Foreign Application Priority Data
Sep. 13, 2000  (DE) ............................... 100 45 205

(51) Int. Cl.
*G01R 31/08*  (2006.01)

(52) U.S. Cl. ...................... 370/230; 370/235; 370/392; 370/400

(58) Field of Classification Search ..................... None
See application file for complete search history.

(56) References Cited

U.S. PATENT DOCUMENTS

| | | | |
|---|---|---|---|
| 5,802,058 A | | 9/1998 | Harris et al. |
| 6,839,323 B1 | * | 1/2005 | Foti ........................... 370/235 |
| 6,904,017 B1 | * | 6/2005 | Meempat et al. ........... 370/238 |

FOREIGN PATENT DOCUMENTS

EP    0 967 756 A1    12/1999

(Continued)

OTHER PUBLICATIONS

ITU-T H.323-2000, "Packet-based Multimedia Communicatoins Systems", 2000, pp. cover, 28, 154, & 228.*

(Continued)

*Primary Examiner*—Chau Nguyen
*Assistant Examiner*—Jung Park
(74) *Attorney, Agent, or Firm*—Staas & Halsey LLP

(57) ABSTRACT

Transmission resources are controlled in individual transmission paths in a packet-oriented communication network, whereby data-packet address information which identifies the origin and the goal of the data packets, is transmitted to a resource manager, responsible for a transmission path, from a network transmission device. On a resource request, for a connection to be subsequently generated, the origin and goal thereof are compared with the origin and goal of the previously transmitted data packets by the resource manager. Should there be agreement, the resource manager can deduce that the connection to be established can equally run over the corresponding transmission path. Correspondingly, establishment of further connections occurs, depending upon the available resources of the transmission path.

19 Claims, 1 Drawing Sheet

FOREIGN PATENT DOCUMENTS

| WO | WO 99/27686 | 6/1999 |
|---|---|---|
| WO | WO 00/08812 | 2/2000 |

OTHER PUBLICATIONS

Schelen et al. "Performance of QoS Agents for Provisioning Network Resources", 1999, IEEE, pp. 17-26.*

Patent Abstracts of Japan, Publication No. 11191776, Publication Date Jul. 13, 1999.

Xiao et al., "Internet QoS: A Big Picture", IEEE Network, IEEE Inc., New York, vol. 13, No. 2, pp. 8-18.

Hiramatsu, "Integration of ATM Call Admission Control and Link Capacity Control by Distributed Neural Networks", IEEE Journal of Selected Areas in Communications, vol. 9, No. 7, Sep. 1991, pp. 1131-1138.

* cited by examiner

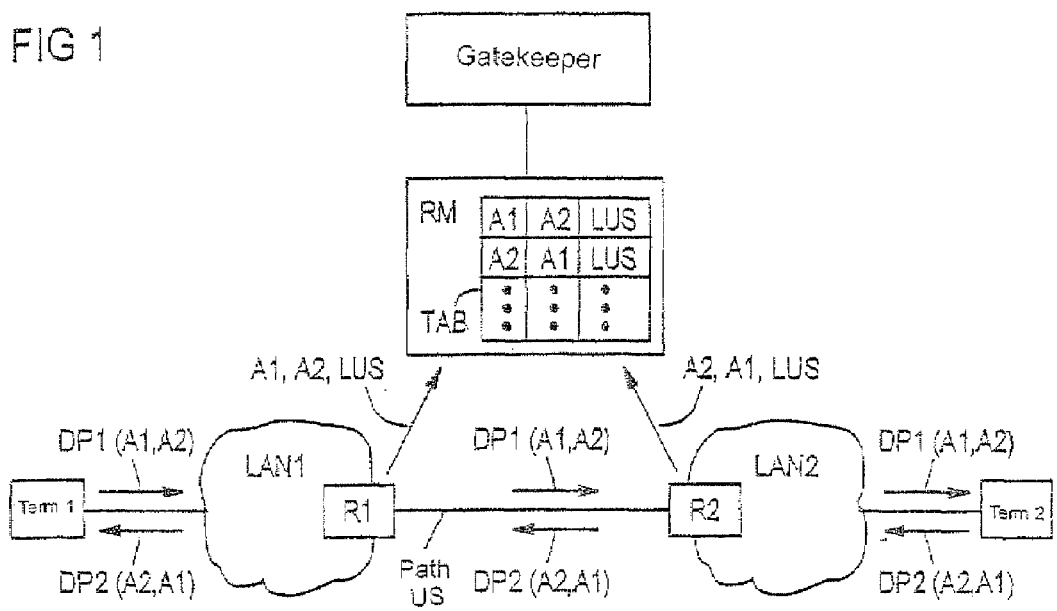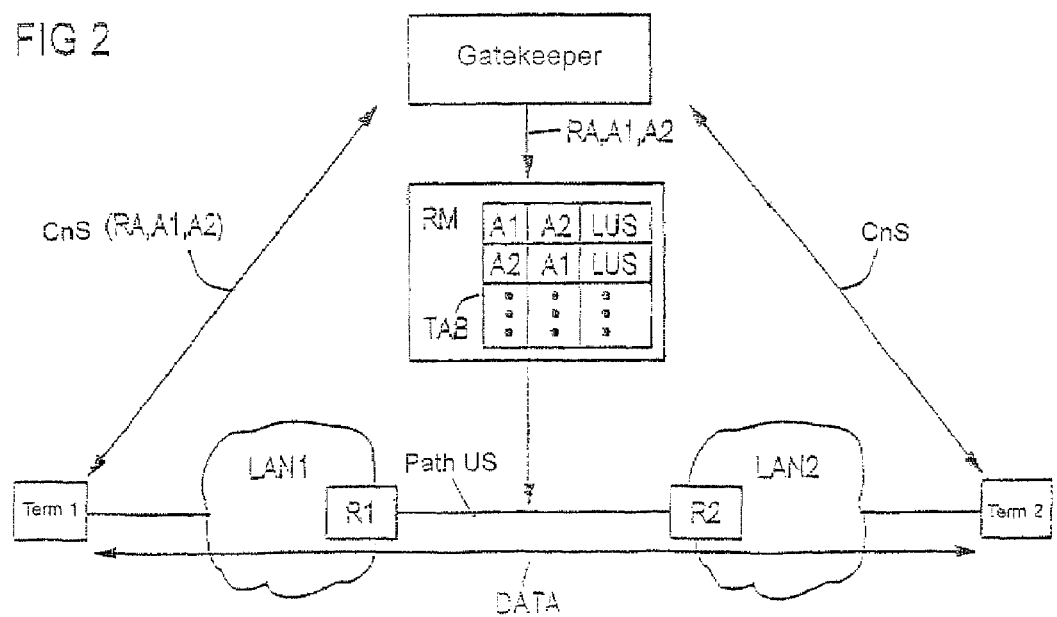

METHOD FOR ESTABLISHMENT OF CONNECTIONS OF PRE-DETERMINED PERFORMANCE FOR A PACKET-ORIENTED COMMUNICATION NETWORK WITH A RESOURCE MANAGER

CROSS REFERENCE TO RELATED APPLICATIONS

This application is based on and hereby claims priority to PCT Application No. PCT/DE01/03325 filed on 29 Aug. 2001 and German Application No. 100 45 205.1 filed on 13 Sep. 2000, the contents of which are hereby incorporated by reference.

BACKGROUND OF THE INVENTION

In many packet-oriented communication networks, such as the Internet, no performance is guaranteed for connections between terminals in these communication networks if no additional precautions are taken. The performance of a connection is also frequently known as "Quality of Service" (QoS) and can include different transmission and connection resources, such as the transmission bandwidth, the transmission rate, the permissible error rate and/or the transmission duration.

In up-to-date communication systems, which are frequently based on such packet-oriented communication networks, resource managers are provided in order to ensure a predetermined performance. In each case these are assigned to a communication network or subnetwork in order to manage its transmission resources. When there is a resource manager, transmission resources which can be predetermined specifically for connections can be reserved for the connections which have to be established. Following a successful reservation of transmission resources, the resource manager monitors the continuous availability of the reserved transmission resources for the connection concerned.

Usually when a connection needs to be established, its origin and destination are transmitted to a resource manager so that it can reserve the necessary transmission resources. The resource manager then uses the transmitted origin and destination information to determine the path over which the connection needing to be established will run. To do this according to known related art, the resource manager needs precise information about the complete topology of the communication network. This information is transmitted to the resource manager very expensively with the aid of a routing protocol. A method of this kind is described in the document "Performance of QoS Agents for Provisioning Network Resources" by Schelén et al. in the Proceedings of IFIP Seventh International Workshop on Quality of Service (IWQoS'99), London, June 1999.

In many cases connections need to be established between different subnetworks in a communication system, for which purpose the subnetworks themselves may well have a very large transmission bandwidth, but are coupled over a transmission path with a proportionately narrow transmission bandwidth. A typical example of this is when local area networks (LANs) are coupled over a public telephone network. In this case the telephone network with its proportionately narrow transmission bandwidth represents a bottleneck for data needing to be exchanged between the local area networks. This leads to the problem of how to control transmission resources efficiently even for connections running through such bottlenecks.

SUMMARY OF THE INVENTION

One possible object of the present invention is to specify a method for a packet-oriented communication network, for the purpose of establishing connections of predetermined performance, a method which enables transmission resources for connections running over individual transmission paths, in particular individual transmission bottlenecks, to be efficiently controlled at low cost.

Within the scope of the method, a transmission resource in a transmission path is managed by a resource manager. A network transmission device which transmits data packets over the transmission path transmits to this resource manager data packet address information identifying the origin and destination of the data packets. The resource manager thus has the information that data packets with the corresponding origin and destination will be transmitted over the transmission path concerned. On a subsequent resource request for a connection to be established, if the origin and destination thereof match the origin and destination of the previously transmitted data packets, the resource manager can then deduce that the connection to be established will—at least with a very high probability—likewise be routed over the corresponding transmission path. Correspondingly, further connections are established, depending upon the available resources of the transmission path.

An advantage of this method relates to the packet address information, in which current information on the path of data packets or connections is transmitted to the resource manager, in which an information database is then automatically updated via the connection routing management in the communication network. This is particularly advantageous in those communication networks where the routing management of a path or connection between predetermined terminals changes frequently.

With regard to the method, let it be understood that a connection also includes subelements known as virtual connections, connection line groups, connection paths or general data streams, with a defined origin and destination in each case. In this sense devices such as terminals, network nodes, switching equipment, communication networks, partial networks or subnetworks can be considered as the origin and destination of such connections.

The performance of a connection under the control of the resource manager can involve quite different transmission resources, such as transmission bandwidth, transmission rate, permissible error rate, transmission delay and/or any other Quality-of-Service parameters, as these are known, and may if necessary be specific to particular service classes or priority classes.

Link information can advantageously be transmitted to the resource manager with the data packet address information, enabling the resource manager to identify the transmission path concerned. Typical link information includes data identifying the network transmission device and if necessary data identifying one of the multiplicity of transmission paths connected thereto. By the transmission of link information, the resource manager is put in a position to exercise separate control over a multiplicity of transmission paths, each of which is identifiable with the aid of the link information, by the method to which aspects of the invention relate.

In an advantageous development the network transmission device can—if necessary at regular intervals—transmit information to the resource manager about the available set of resources on the transmission path. In this way the extent of the resources being managed by the resource manager can be updated on the basis of the latest transmission situation. This is particularly advantageous in that it directly notifies the resource manager about unforeseen adverse effects on the behavior of the transmission path, without needing to make a detour through a costly routing protocol.

In addition various measures can be taken to reduce the amount of data to be transmitted from the network transmission nodes to the resource manager:

For example, before transmitting data packet address information a check is first made on whether data packet address information with the same contents has already been sent earlier. Transmission then takes place only if the check turns out to be negative. In order for the check to be possible, previously sent items of data packet address information must be stored by the network transmission device.

Furthermore, depending on the data packet address information, the network transmission device can send the resource manager routing information for recognizing connections running over the transmission path. Such routing information can typically be determined by accessing a routing table. In this instance routing information can mean, for example, that all data packets with an origin and/or destination subnetwork address specified in the routing information will be transmitted over the transmission path.

In addition the data packet address information in a data packet can be transmitted dependent on transmission information contained in that data packet. By this it is possible for instance for data packets that are exchanged between non-connectable terminals or applications on the communication network to be excluded from using the method. Such packets can be recognized by the network transmission nodes by transmission information contained in the data packet, such as an origin address and/or destination address, or in certain cases a protocol number and/or port number.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 shows a communication system with two subnetworks connected over a transmission path in the course of transmitting data packets; and FIG. 2 shows the same communication system in the course of establishing a connection.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

FIG. 1 and FIG. 2 show in each case diagrams of the same communication system with two packet-oriented, preferably Internet protocol based communication subnetworks LAN1 and LAN2, which in this exemplary embodiment take the form of local area networks. Local area network LAN1 has a router device R1 which is connected over a transmission path US to a router device R2 on local area network LAN2. For the exemplary embodiment it can be assumed that the transmission path US has significantly fewer transmission resources than the local area networks LAN1 and LAN2 and therefore represents a transmission bottleneck for a data exchange between local area networks LAN1 and LAN2. A situation of this kind frequently occurs in practice, for instance when a multiplicity of local area networks belonging to a company are located in different places and connected over the public communication network or the Internet. Local area networks connected together in this way are also frequently known as a "virtual private network" (VPN).

Instead of the router devices R1 and R2, which here take the form of devices known as edge routers, it is also possible to connect together the local area networks LAN1 and LAN2 with the aid of elements known as gateways, switching devices, modems or general network nodes or network transmission nodes belonging to a private or public communication network.

To manage the transmission resources of the local area networks LAN1 and LAN2 and in particular the transmission path US, a central resource manager RM is arranged within the communication system. The resource manager RM is the element in the communication system that is responsible for reserving transmission resources for connections which need to be established, and for ensuring the performance of established connections. Transmission resources or performance can involve quite different transmission parameters, such as a maximum or medium transmission bandwidth, transmission delay and/or transmission error rate. For all connections which require a performance guarantee in the communication system, the corresponding transmission resources must be requested from the resource manager RM and released again once the connection is cleared.

In addition a terminal EG1 is connected to local area network LAN1 and a terminal EG2 is connected to local area network LAN2. Terminals EG1 and EG2 can take the form of any terminal for the communication of speech, video and/or data, or can even be a personal computer. Address information A1 is assigned to terminal EG1 and address information A2 is assigned to terminal EG2. Terminals EG1 and EG2 can be uniquely addressed and identified in the communication system by address information A1 and A2. In an alternative embodiment it is possible to provide another router device or switching device or another communication system network node in place of at least one of the terminals EG1 and EG2.

Furthermore the communication system has a central device known as a gatekeeper GK which is connected to the resource manager RM. The gatekeeper GK is responsible for logical control, that is, the establishment, clearing down and monitoring of connections in the communication system. To establish a connection with guaranteed performance, the origin and destination of the connection to be established must be sent to the gatekeeper GK together with a resource request. In the exemplary embodiment the gatekeeper GK satisfies ITU-T standard H.323.

According to another embodiment a device known as an SIP server, which supports the protocol known as SIP (session initiation protocol) in accordance with the IETF standard, can be used instead of the gatekeeper GK.

The resource manager RM moreover has an allocation table TAB where the origin and destination addresses of data transfers in the communication system are assigned to individual transmission paths.

FIG. 1 shows the communication system in the course of transmitting data packets DP1 and DP2 over transmission path US. In the exemplary embodiment, data packets DP1 are transmitted into local area network LAN1 by terminal EG1, in the scope of a data transfer which is not further defined, with address information A1 as the origin address and address information A2 identifying terminal EG2 as the destination address. The router device R1 of local area network LAN1 recognizes by the destination address A2 that the destination terminal EG2 is accessible over local area network LAN2 and consequently transmits data packets DP1 over the transmission path US and the router device R2 into local area network LAN2. This then forwards data packets DP1 to the destination terminal EG2. In a similar way data packets DP2 are transmitted into local area network LAN2 by terminal EG2, in the scope of another data transfer which is not further defined, with address information A2 as the origin address and address information A1 identifying terminal EG1 as the destination address, and are transmitted from there over local area network LAN1 to destination terminal EG1.

In the exemplary embodiment, both the data transfer from terminal EG1 to terminal EG2 and the data transfer in the opposite direction are carried out over the transmission path US. In general, however, the path taken by data transfers can also be dependent on the direction of transfer. Furthermore the transmission resources of the transmission path US can be different for the two directions of transmission, and accordingly the resource manager RM generally manages them separately.

The router device R1 transmits the origin address contained in the data packet DP1 which is to be transmitted, in this example A1, and the destination address, in this example A2, together with link information LUS identifying the transmission path US, to the resource manager RM. The resource manager then stores the address information A1 as the origin address, the address information A2 as the destination address, and the link information LUS, cross-allocated, in the allocation table TAB. In a similar way the router device R2 transmits the origin address contained in the data packets DP2 which is to be transmitted, in this example A2, and the destination address, in this example A1, together with link information LUS identifying the transmission path US, to the resource manager RM. The resource manager stores the address information A2 as the origin address, the address information A1 as the destination address, and the link information LUS, cross-allocated, in the allocation table TAB. The resource manager RM can therefore determine by accessing the allocation table TAB that both a data transfer from terminal EG1 to terminal EG2 and a data transfer in the opposite direction are each being carried out over transmission path US. Reading and transmitting the address information A1 or A2 contained in the data packets DP1 or DP2 can be carried out by the router devices R1 and R2 preferably with the aid of an element which additionally has to be implemented, known as a monitoring component, for observing data packet traffic. The transmission of information from the router devices R1 and R2 to the resource manager RM preferably takes place over logical signaling channels.

Preferably the router devices R1 and R2 only ever transmit address information and link information to the resource manager RM when the information concerned changes. For this purpose address information to be transmitted from the router devices R1 and R2 to the resource manager RM is stored and compared with the current address information contained in subsequent data packets. The current address information is only transmitted to the resource manager RM if it does not match the stored address information. This prevents identical address and link information for each of the individual data packets DP1 or DP2 being repeatedly transmitted to the resource manager RM.

The amount of information to be transmitted from the router devices R1 and R2 to the resource manager RM can also be reduced by sending the resource manager generalized routing or address information, for instance in the form of subnetwork addresses. The router devices R1 and R2 can frequently recognize with the aid of a data packet that has to be sent over the transmission path US, that yet more data traffic will be carried over the transmission path US. In this case the router device R1, for example, by accessing a routing table which states that all data packets directed to the local area network LAN2 are to be transmitted over the transmission path US, can determine with the aid of a data packet arriving from terminal EG1 that all data packets from terminal EG1 which are to be transmitted into local area network LAN2, regardless of the destination terminal, will be sent over the transmission path US. In this case the router device R1 can send the resource manager RM the address information A1 as the origin address and the subnetwork address of the local area network LAN2 as the destination address.

FIG. 2 shows a diagram of the communication system establishing a connection from terminal EG1 to terminal EG2. The connection to be established is independent of the preceding data transfers between the terminals EG1 and EG2. A situation of this kind frequently occurs when, for example, terminals EG1 and EG2 are in the form of personal computers between which both an active transfer of files takes place without a performance guarantee and connections for transmitting voice over Internet protocol (VoIP) are established with guaranteed performance.

Within the scope of establishing a connection, connection signaling VAS is carried out between the terminal EG1 and the gatekeeper GK as well as between the gatekeeper GK and the terminal EG2. For this purpose logical signaling channels are provided between the terminal EG1 and the gatekeeper GK as well as between the gatekeeper GK and the terminal EG2. The logical signaling channels for connection establishment signaling are shown in FIG. 2 by unbroken double-headed arrows. Connection establishment signaling is preferably carried out in accordance with ITU-T Recommendation H.323v2. This type of connection establishment signaling is also frequently known as "fast connect".

Within the scope of connection establishment signaling VAS, the address information A1 identifying the connection origin EG1, the address information A2 identifying the connection destination EG2 and a resource request RA are transmitted to the gatekeeper GK by the terminal EG1 initiating the connection. The gatekeeper transmits the resource request RA and the address information A1 and A2 to the resource manager RM and initiates the connection between the terminals EG1 and EG2.

According to an alternative embodiment of the connection establishment, the terminal EG1 can transmit to the gatekeeper GK a logical destination address (not shown) which identifies the connection destination EG2, such as an alias address, e-mail address, URL (uniform resource locator) or E.164 address. The logical destination address is then converted by the gatekeeper GK into a transport address identifying the connection destination EG2, in this example A2, and transmitted in this form to the resource manager RM. The transport address in this case refers to the address information by which the data packets can be steered through the communication system. A transport address of this kind can, for instance, be composed of an IP address (IP: Internet protocol) and a port number.

When the address information A1 and A2 is transmitted, the origin and destination of the connection that needs to be established is known to the resource manager RM, but not its path.

In order to obtain information on the path of the connection that needs to be established, the resource manager RM looks in the allocation table TAB for an entry with an origin address that matches the address information A1 transmitted by the gatekeeper GK and a destination address that matches the address information A2 transmitted by the gatekeeper GK. If a subnetwork address is contained in the allocation table TAB as the origin address or destination address, a match between this subnetwork address and the corresponding subnetwork address part of the address information A1 or A2 concerned transmitted by the gatekeeper GK is judged to be a match within the meaning of the method.

In the exemplary embodiment the very first entry in the table is found to be in agreement and the link information LUG for this entry is read. By the link information LUG read in this way, the resource manager RM recognizes that the connection which needs to be established will be routed over the transmission path US identified by the link information LUG. This causes the resource manager RM to take into consideration in particular the currently available transmission resources of the identified transmission path US when making transmission resources available in accordance with the resource request RA.

If the requested transmission resources on the transmission path US are not currently available, establishment of the connection is cancelled. In the event that no entry showing agreement in the above sense is found in the allocation table TAB, the connection establishment may preferably be continued, although the resource manager RM does not know that the connection is routed over the transmission path US. This method can in some cases lead to a situation where the requested transmission resources can no longer be guaranteed after the connection is established. Such cases are very rare however, since in the main they can occur only during a short starting phase of the communication system when terminals EG1 and EG2 have not yet exchanged any data packets. Even so, in order to avoid such cases, reserves of resources can be provided by the resource manager RM.

Once the connection is established, useful data DATA can be exchanged between terminals EG1 and EG2 over the local area networks LAN1 and LAN2 and the transmission path US with guaranteed performance.

As already mentioned above, the transmission resources available on the transmission path US are considerably less than the transmission resources of the local area networks LAN1 and LAN2. For this reason the transmission resources available on the transmission path US are the critical factor for the control of the transmission resources for the connection. The special control of the transmission resources on the transmission path US by the resource manager RM is indicated in FIG. 2 by a dotted arrow.

The transmission resources on the transmission path US can if necessary be managed and controlled by service class, priority class and/or transmission direction. A simple implementation of such a resource management includes dividing the data traffic into different service and/or priority classes and assigning to each of these classes a proportion of the available transmission resources of transmission path US—if necessary making them specific to the direction of transmission. These kinds of data traffic classes are also frequently referred to as DiffServ classes. Preferably a class of data traffic for connectionless data traffic, i.e. traffic for which no logging on is required, can also be provided. Data traffic belonging to this class of traffic would have no performance guarantee. To manage traffic classes the resource manager RM can be provided with a resource table (not shown), with entries for each individual traffic class showing the transmission resources reserved for connections and the resources still remaining.

So that data packets that have to be transmitted can be allocated to individual traffic classes with guaranteed performance, these data packets can be labeled with traffic class information. From this labeling the router devices R1 and R2 can recognize the traffic class to which a data packet due for transmission is assigned, and which transmission resources are reserved for this data packet if appropriate.

It is furthermore possible to provide for the resource manager RM to notify the router device R1 or R2 about every successful resource reservation affecting the transmission path US. The router device R1 or R2 can then be operated in such a way that only data packets from connections for which the resource reservation has been notified in this way will be handled in accordance with the resource reservation and traffic class association concerned.

The invention has been described in detail with particular reference to preferred embodiments thereof and examples, but it will be understood that variations and modifications can be effected within the spirit and scope of the invention.

The invention claimed is:

1. A method for establishing a packet-oriented connection of predetermined performance using a network transmission device and a transmission path, comprising:
    managing a transmission-oriented set of resources on the transmission path by a resource manager,
    reading data packet address information from data packets that have been transmitted or are to be transmitted over the transmission path, the data packets being independent from the connection to be established, the address information identifying the origin and destination of the data packets and being read by the network transmission device;
    transmitting the address information from the network transmission device to the resource manager,
    transmitting a resource request to the recourse manager in order to establish the connection, the resource request having connection information identifying the origin and destination of the connection, the address information being transmitted before the resource request,
    using the connection information and the data packet address information to determine whether the origin and destination of the connection match the origin and destination of the data packets, and
    if the origin and destination of the connection match the origin and destination of the data packets, considering available resources on the transmission path in further evaluating establishment of the connection such that a positive match causes the available resources to be considered.

2. The method according to claim 1, wherein link information identifying the transmission path is transmitted to the resource manager with the data packet address information.

3. The method according to claim 1, wherein the connection is established only if the resource request does not exceed available resources on the transmission path.

4. The method according to claim 1, wherein the network transmission device transmits resource information to the resource manager concerning available resources on the transmission path.

5. The method according to claim 1, wherein
    before transmitting the data packet address information, the network transmission device checks whether identical data packet address information has already been sent to the resource manager, and the network transmission device transmits data packet address information only if identical data packet address information has not already been sent.

6. The method according to claim 1, wherein depending on the data packet address information, the network transmission device transmits routing information to the resource manager for recognizing connections running over the transmission path.

7. The method according to claim 1, wherein transmission of the data packet address information to the resource manager is dependent on transmission information contained in the data packet, from which the data packet address information was read.

8. The method according to claim 1, wherein the set of resources on the transmission path is managed by the resource manager according to at least one of service class and priority class.

9. The method according to claim 1, wherein the network transmission device is controlled by the resource manager so that together, the network transmission device and the resource manager safeguard performance of the connection.

10. The method according to claim 1, wherein a gatekeeper is provided for logical establishment of the connection.

11. The method according to claim 2, wherein the connection is established only if the resource request does not exceed available resources on the transmission path.

12. The method according to claim 11, wherein the network transmission device transmits resource information to the resource manager concerning available resources on the transmission path.

13. The method according to claim 12, wherein
before transmitting the data packet address information, the network transmission device checks whether identical data packet address information has already been sent to the resource manager, and
the network transmission device transmits data packet address information only if identical data packet address information has not already been sent.

14. The method according to claim 13, wherein depending on the data packet address information, the network transmission device transmits routing information to the resource manager for recognizing connections running over the transmission path.

15. The method according to claim 14, wherein transmission of the data packet address information to the resource manager is dependent on transmission information contained in the data packet, from which the data packet address information was read.

16. The method according to claim 15, wherein the set of resources on the transmission path is managed by the resource manager according to at least one of service class and priority class.

17. The method according to claim 16, wherein the network transmission device is controlled by the resource manager so that together, the network transmission device and the resource manager safeguard performance of the connection.

18. The method according to claim 17, wherein a gatekeeper is provided for logical establishment of the connection.

19. A method for establishing a packet-oriented communication connections of predetermined performance, comprising:
reading packet address information from data packets transmitted over a transmission path, the data packets being transmitted independently from the connection to be established, the address information identifying the origin and destination of the data packets and being read by a router;
transmitting the address information, along with information identifying the transmission path, from the router to a resource manager;
transmitting a request to the resource manager in order to establish the connection, the address information being transmitted before the request, the request having connection information identifying the origin and destination of the connection;
using the connection information and the address information to determine whether the origin and destination of the connection match the origin and destination of the data packets; and
if the origin and destination of the connection match the origin and destination of the data packets, then concluding that the transmission path is a possible route for the connection such that a positive match causes further evaluation of the transmission path.

\* \* \* \* \*